United States Patent
Kress et al.

[19]

[11] Patent Number: 6,050,159
[45] Date of Patent: Apr. 18, 2000

[54] FACING HEAD WITH ROTARY SLIDE

[75] Inventors: Dieter Kress, Aalen; Hans W. Beck, Sinsheim-Hoffenheim; Herbert Jäger, Sinsheim-Elsenz, all of Germany

[73] Assignee: Mapal Fabrik fur Prazisionwerkzeuge, Germany

[21] Appl. No.: 09/241,974

[22] Filed: Feb. 1, 1999

[30]    Foreign Application Priority Data

Jan. 30, 1998 [DE]    Germany ............................ 198 03 613

[51] Int. Cl.[7] .................................................. B23B 47/20
[52] U.S. Cl. .................................. 82/1.2; 82/63; 82/70.2; 82/113; 82/131; 408/152; 409/231
[58] Field of Search ................................ 82/63, 112, 113, 82/1.2, 70, 70.2, 53.1, 123, 131; 408/152; 409/231

[56]    References Cited

U.S. PATENT DOCUMENTS

| | | | |
|---|---|---|---|
| 3,289,554 | 12/1966 | Cvacho et al. ........................... | 82/63 X |
| 5,528,830 | 6/1996 | Hansen .................................... | 82/63 X |
| 5,759,000 | 6/1998 | Wawrzyniak et al. .................. | 82/1.2 X |

FOREIGN PATENT DOCUMENTS

| | | |
|---|---|---|
| 4015509 | 5/1990 | Germany . |
| 4125106 | 2/1993 | Germany . |
| 2066128 | 7/1981 | United Kingdom ....................... 82/63 |

*Primary Examiner*—Henry W. H. Tsai
*Attorney, Agent, or Firm*—Ostrolenk, Faber, Gerb & Soffen, LLP

[57]    ABSTRACT

A facing head includes a housing with a center axis and a rotary slide with a rotation axis offset from the housing center axis. At least one cutter plate is provided on the rotary slide and rotatable therewith. A centrifugal drive is located in the housing which rotates the rotary slide about its axis of rotation. The centrifugal drive includes at least two driving bodies which are mounted within the base body of the facing head and which are displaceable essentially perpendicular to the center axis under the influence of centrifugal force. The rotary slide rotates under the influence of a spring return device when centrifugal force does not move the driving bodies outward. A coupling device in the form of a gear wheel on the rotary slide co-operates with racks on the driving bodies so that the driving bodies move together but in opposition.

11 Claims, 3 Drawing Sheets

FACING HEAD WITH ROTARY SLIDE

BACKGROUND OF THE INVENTION

The invention relates to a facing head with at least one rotary slide, having at least one cutter plate, and particularly to the drive for rotating the rotary slide for repositioning it.

Facing heads of this type have at least one rotary slide on which a cutter plate is mounted. The cutter plate cuts and machines a surface which is essentially planar in the finished machined state. While the surface is being machined, the rotary slide is driven, so that it rotates about its rotation axis. In this case, rotation of at most 180° is usually executed. To execute that rotation, the rotary slide is connected to a driving rod, which extends through the facing head in a longitudinal direction, and specifically extends into the machine spindle which sets the facing head in rotation. It is, therefore, necessary for special machine spindles to be provided for facing heads of this kind. This makes it impossible for facing heads of this kind to be generally used. Moreover, special machine spindles of this type are very complicated and expensive.

SUMMARY OF THE INVENTION

The object of the invention is, therefore, to provide a facing head of this type, which has a simple drive and which can be generally used in known machining centers.

To achieve this object, a facing head having control over rotation of the rotary slide is herein proposed. It includes a housing with a center axis, a rotary slide in the housing with an offset rotation axis and a cutter plate on the slide. It includes a centrifugal drive which is integrated in the facing head and which operates to rotate the rotary slide about its axis of rotation. Since the axis of rotation of the rotary slide is offset relative to the center axis of the facing head, the cut machining of a surface can be performed during rotation of the rotary slide.

The centrifugal drive includes at least two driving bodies which are so accommodated in the base body of the facing head as to be displaceable during rotatation of the tool. The driving bodies cooperate with a return device which returns the bodies into their basic position when centrifugal forces fall below a predeterminable limit value. To avoid an imbalance of the facing head during displacement of the driving bodies, these bodies are connected to one another with the aid of a coupling device which moves the driving bodies in opposite directions.

In a preferred embodiment of the facing head, the coupling device has racks which are each connected to a driving body and are coupled to one another via a gearwheel. This coupling causes the two driving bodies to each be displaced by the same distance relative to the center axis of the facing head so that an imbalance during the displacement of the driving bodies cannot occur.

In another embodiment of the facing head, the return device has at least one spring element which acts on at least one driving body. The spring element exerts a force which counteracts centrifugal forces and which, where appropriate, acts only on one driving body. Since the one driving body is connected to the other driving body via the coupling device, the other driving body is also subjected to a return force even when only a single spring element is provided. The facing head can therefore have a very simple design, thus allowing, on the one hand, cost effective implementation and, on the other hand, very small forms of construction.

Other features and advantages of the present invention will become apparent from the following description of the invention which refers to the accompanying drawings.

DETAILED DESCRIPTION OF THE INVENTION

Figure 1:
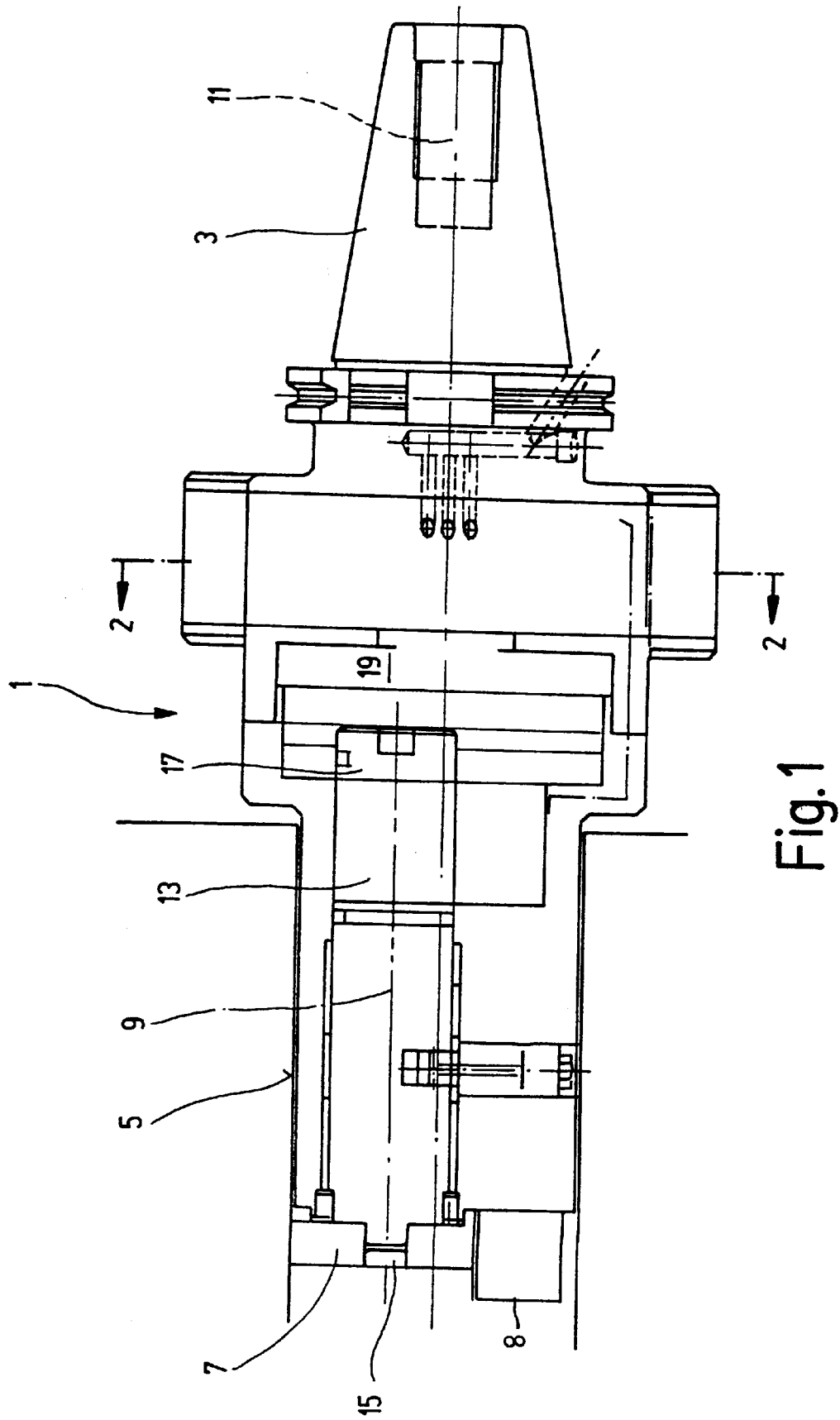
FIG. 1 shows a basic side view of a facing head.

FIG. 1 shows a facing head 1 which comprises a steep angle taper 3, which is capable of being introduced into a machine spindle, not illustrated, of a machine tool. It has a tool head 5 with a rotary slide 7, on which one or more cutter plates for machining a plane face can be mounted. The rotary slide is rotatable about an axis of rotation 9, which is arranged offset, upwardly here, relative to a center axis 11 of the facing head 1. The rotary slide 7 is rotatable by a drive shaft 13 which is connected fixedly for rotation at its left end 15 to the rotary slide. A centrifugal drive 19 engages in a suitable way on the right end 17 of the drive shaft and the drive 19 is integrated into the facing head 1. The head 1 and the drive 19 are detailed in FIG. 2.

Figure 2:
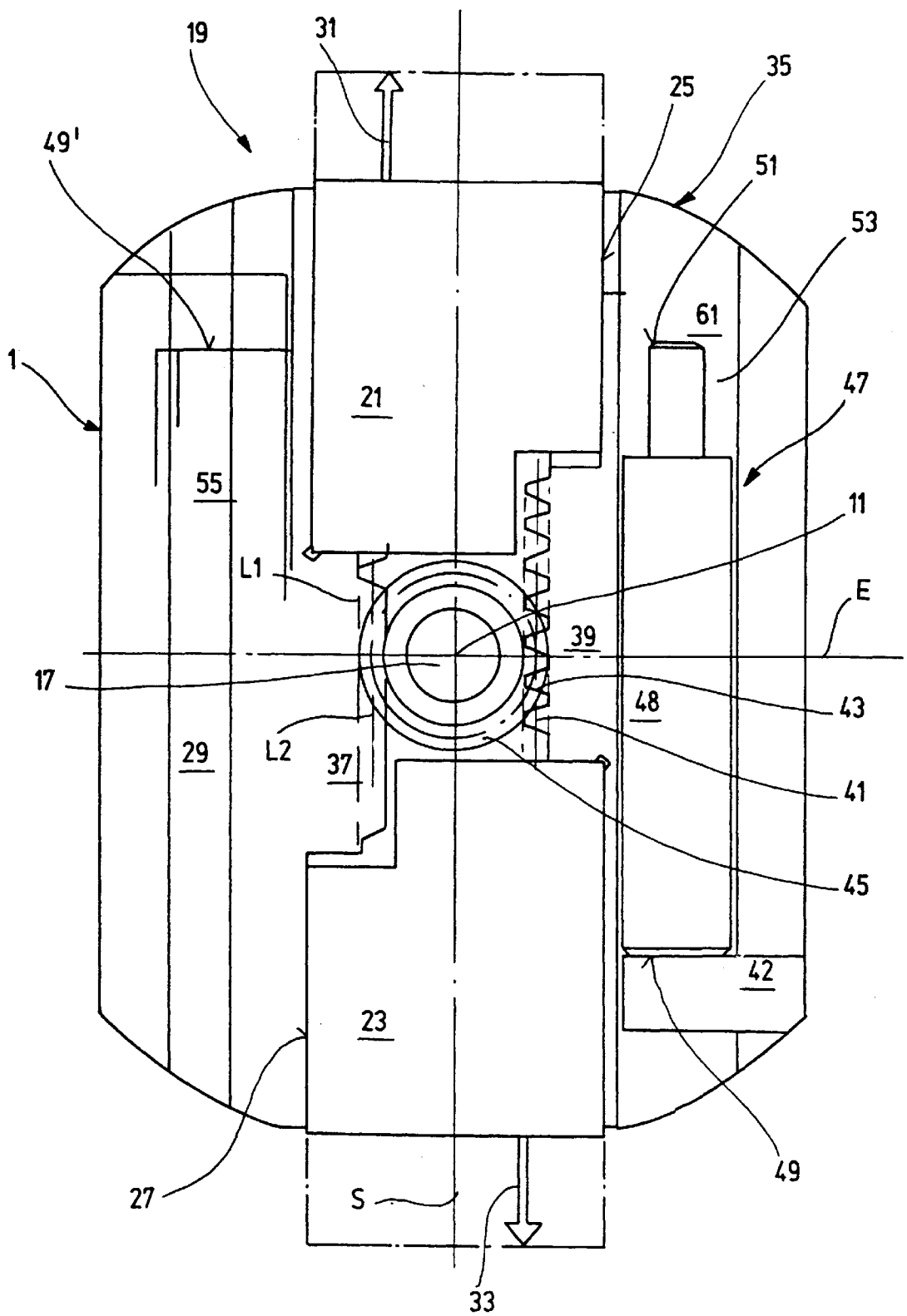
FIG. 2 shows a cross section through the facing head in FIG. 1.

FIG. 2 shows a longitudinal section perpendicular to the center axis 11 and through the facing head 1, showing the centrifugal drive 19 according to FIG. 1, as seen from the right.

The centrifugal drive 19 comprises at least two driving bodies 21 and 23 which are arranged preferably in a plane running perpendicularly to the center axis 11, that is, in the image plane of FIG. 2. They are accommodated in suitable respective recesses 25 and 27 in the base body 29 of the facing head 1. The outer contours of the driving bodies 21 and 23 are coordinated with the contours of the respective recesses 25 and 27, such that the driving bodies are mounted displaceably in the base body 29. The frictional forces between the driving bodies 21 and 23 and the base body 29 are selected so that, when the facing head 1 rotates, the driving bodies can be displaced outwardly, as indicated by double arrows 31 and 33, on account of the centrifugal forces which act radially outwardly from the center axis 11. The driving bodies 21 and 23 are preferably displaced radially, since that is when the lowest friction forces occur. However, under centrifugal force, it is also possible that the driving bodies are displaced at an angle to an imaginary perpendicular to the center axis 11, that is, not directly radially.

The driving bodies 21 and 23 are provided with a coupling device 35 which couples the movements of the two driving bodies 21 and 23 or synchronizes them such that they move in the same way but in the opposite directions with respect to the center axis 11 or with respect to a plane E coinciding with the center axis 11. The coupling device 35 ensures that the facing head 1 remains in the balanced state even when the driving bodies 21 and 23 are displaced.

The coupling device 35 has a first rack 37 coupled to the first driving body 21 and a second rack 39 coupled to the second driving body 23 in such a way that the racks move together with their respective driving bodies. When the driving bodies 21 and 23 are moved outwardly by centrifugal force, according to the double arrows 31 and 33, the first rack 37, together with the first driving body 21, and the second rack 39, together with the second driving body 23, are displaced outwardly here parallel to an imaginary perpendicular S which is perpendicular to the plane E or coinciding with an imaginary diameter line.

The racks 37 and 39 have teeth on their sides facing the center axis 11. For simplicity, the teeth 41, 43, etc. of the second rack 39 are illustrated, whereas those of the first rack 37 are merely indicated by two lines L1 and L2.

The teeth 41, 43, etc. mesh with a gear wheel 45 having a center axis and an axis of rotation which coincide with the center axis 11 and the wheel 45 is set in rotation during displacement of the racks 37 and 39 in such a way that, upon outward movement of the driving bodies 21 and 23 along the double arrows 31 and 33, clockwise rotation of the gear wheel 45 is induced. The gear wheel 45 couples the movements of the two driving bodies 21 and 23.

It is apparent that the driving bodies 21 and 23 and the associated racks 37 and 39 may also be arranged in mirror inverse relative to the perpendicular S, so that counterclockwise, rather than clockwise rotation of the gear wheel 45 takes place when the driving bodies are displaced outwardly.

The gear wheel 45 is coupled rotatively fixedly to the right end 17, illustrated in FIG. 1, of the drive shaft 13. Any desired intermediate elements, which transmit rotation of the gear wheel 45 to the drive shaft 13 and induce rotation of this drive shaft, may also be arranged here. It is particularly preferred to have direct coupling between the gear wheel 45 and the drive shaft 13, as it avoids an interposed gear assembly, giving the facing head 1 a particularly small and compact design. The movement of the driving bodies 21 and 23 drives the rotary slide 7 in dependence upon centrifugal force.

Figure 3:
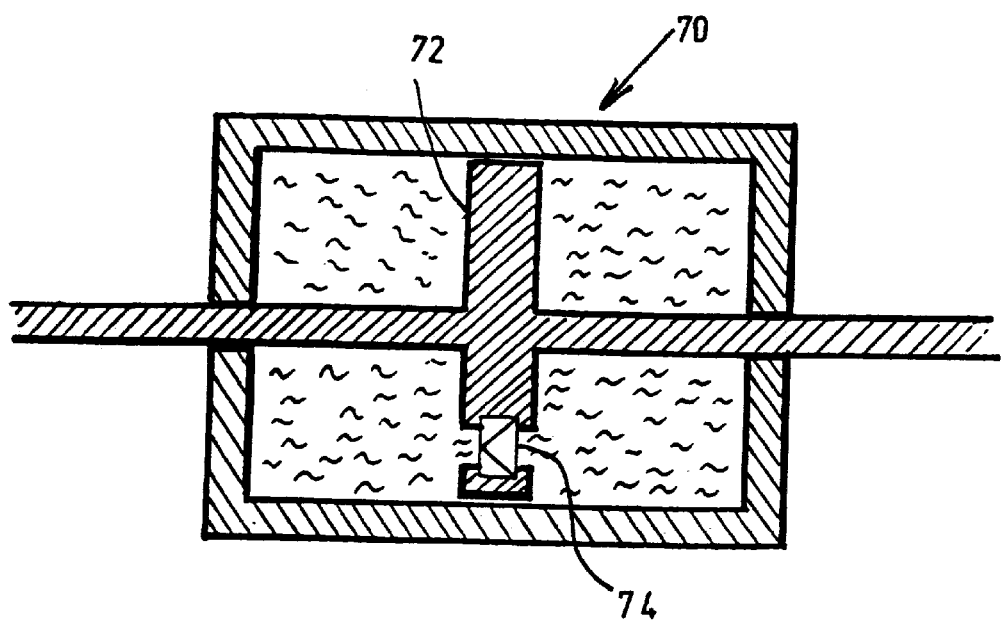
FIG. 3 schematically illustrates a brake in the facing head.

To achieve uniform rotation of the rotary slide 7 and, consequently, a uniform feed of the cutter plate, an oil brake shown in FIG. 3 is integrated into the facing head. The oil brake 70 is designed, for example, in such a way that a disk 72, into which a throttle 74 is integrated and which is mounted rotationally on the rotary slide 7, brakes the slide by conveying oil through the throttle to the right in FIG. 3. For the rapid return of the cutter plate, which is induced by spring force, the throttle includes a nonreturn valve, which allows the oil to flow back to the left, virtually without any throttling. The cutter plate is moved between two positions. During the movement from the first to the second position the workpiece is machined. That is why during this phase the cutting plate has to move slowly along the surface of the workpiece. The slow movement of the cutting plate is effected by the throttle device. During the reverse movement from the second position to the first position, the workpiece just having been machined is either removed and a new workpiece is delivered or the workpiece is carried into another spatial position so that another portion of it can be machined. This fast reverse movement is also effected by the throttle device. In FIG. 3, the centrifugal device is to the right and the rotary slide to the left of the brake 70.

The operation of the driving bodies 21 and 23 permits a plurality of driving bodies to be arranged along the center axis 11 which are introduced into the base body 29 of the facing head 1, if appropriate so as also to be offset at 90°. This embodiment reinforces the forces acting on the drive shaft 13.

The facing head 1 or the centrifugal drive 19 include a return device 47 which has at least one spring element 48. The spring element 48 here is a pneumatic compression spring which is supported, on the one hand, in the base body 29, on a suitable shoulder 49 serving as one abutment and, on the other hand, on a projection 51 provided on the second rack 39, which likewise serves as an other abutment.

The spring element 48 may have a highly compact design. It is accommodated in a recess 53 in the base body 29. It is clear that the return device 47 can be equipped with any desired type of spring element 48 acting as a compression spring.

Since the two driving bodies 21 and 23 are coupled to one another in a mechanically rigid manner via the coupling device 35, that is, via the racks 37 and 39 and via the gear wheel 45, a single spring element 48 is sufficient to produce a return device 47. Preferably, however, two spring elements 48 and 55 are arranged symmetrically to the perpendicular S, on the one hand, to increase the return forces and, on the other hand, to avoid imbalance of the facing head 1. The spring element 55 is indicated here merely in its region facing the shoulder 49'. It is otherwise identical to the spring element 48.

The spring element 48 exerts a force on the projection 51 in the direction of the double arrow 31, which is opposite the direction of displacement of the driving body 23. The direction of displacement is indicated by the double arrow 33 and is determined by centrifugal force.

The spring elements 48 and 55 of the return device 47 are designed such that displacement of the driving bodies 21 and 23 is determined only beyond a specific predetermined magnitude of the centrifugal force which acts in the direction of the double arrows 31 and 33. Until this limiting centrifugal force is exceeded, the gear wheel 45 is not moved by the racks 39 and 37. The rotary slide 7 therefore remains at rest. After the limiting rotational speed has been exceeded, the driving bodies 21 and 23 of the centrifugal drive 19 move outwardly, so that the gear wheel 45 and, consequently, the drive shaft 13 are moved via the racks 37 and 39. This rotates the rotary slide 7 and consequently displaces the cutter plate 8 coupled to the slide. That cutter plate consequently machines an annular region on a plane 8 face which is machined by means of the facing head 1.

If the centrifugal force falls below the predetermined value, the spring elements 48 and 55 can displace the driving bodies 21 and 23 in the direction of the center axis 11 or of the plane E, counter to the centrifugal force acting in the direction of the double arrows 31 and 33.

Return movement of the driving bodies 21 and 23 is induced by the spring elements 48 and 55 in the directions opposite to the double arrows 31, 33. Through the racks 37 and 39, this rotates the gear wheel 45 counterclockwise, so that the rotary slide 7 is also moved in the opposite direction via the drive shaft 13.

The facing head 1 has a very simple design. The design of the return device 47, or the spring element 48 or spring elements 48 and 55, causes radially outward movement of the driving bodies 21 and 23, and therefore causes rotation of the rotary slide 7, when a predeterminable rotation speed of the facing head i is exceeded. The limiting rotational speed of the facing head 1 is also determined by the weight or mass of the driving bodies 21 and 23. These may be comprised of metal, for example of the same material as the facing head 1, or else, preferably, of a so called heavy metal, for example sintered tungsten, having a density which is approximately twice as great as the density of the initial material of the facing head 1.

Through use of suitable gear wheels inside the facing head 1, a plurality of drive shafts and, consequently, a plurality of rotary slides can also be set in rotation by the driving bodies. The facing head 1 may be provided with more than a single rotary slide 7, as mentioned here in the description.

The facing head 1 has a very simple design so that conventional driving rods for rotating the rotary slide 7 may be dispensed with. The facing head 1 may therefore be used together with conventional machine spindles, without any adaptation, and may be readily employed in known CNC stations. The simple design of the facing head 1 gives it a relatively low space requirement, so that the facing head 1 can be highly compact. The coupling device 35 causes the tool to always be balanced, irrespective of the positions of the driving bodies 21 and 23. It is also possible, therefore, inter alia, to operate the facing head at very high rotational speeds, of up to 6000 revolutions per minute, and above. The simple design of the facing head 1 also requires very low maintenance.

Operation of the facing head is described. The facing head 1 is rotated when mounted on a spindle. Sufficient speed rotation of the facing head displaces the driving bodies 21 and 23 radially outward far enough under the centrifugal force and against the return spring 48, 55. When the driving bodies are displaced radially outward, they rotate the rotary slide 7 sufficiently so that the cutting plates 8 project out of the side of the facing head 1 and machine a surface (not shown). On the other hand, as the facing head rotation slows or stops, the driving bodies 21, 23 return inward, which rotates the rotary slide to a position so that the cutting plates no longer project outwardly enough to cut a surface. The purpose of the driving bodies is to reorient the rotary slide 7 and the cutting plates on the slide between a projecting cutting orientation and a non cutting orientation.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A facing head comprising:

a housing having a center axis;

a rotary slide in the housing, the rotary slide having a rotation axis, the rotation axis being radially offset from the center axis of the housing;

at least one cutter plate mounted on the slide for rotation about the rotation axis;

a centrifugal drive in the facing head connected with the rotary slide for rotating the rotary slide about its axis of rotation between first and second positions, and the centrifugal drive being operable by rotation of the facing head;

the centrifugal drive including:
      a base body;
      at least two driving bodies mounted in the base body of the facing head and displaceable essentially perpendicular to the center axis of the facing head to rotate the rotary slide to the second position upon application of centrifugal force;
      a return device for displacing the driving bodies radially inwardly to rotate the rotary slide to the first position when there is insufficient centrifugal force due to rotation of the facing head for displacing the driving bodies outwardly;
      a coupling device connected between the return device and the driving bodies causing the driving bodies to displace in opposition to each other upon application of centrifugal force thereto and under the action of the return device and
      a drive shaft in the housing extending along the rotation axis of the rotary slide and connected with the rotary slide for driving the rotary slide to rotate.

2. The facing head of claim 1, wherein the coupling device comprises:

a respective rack at each of the driving bodies and each rack is displaceable along with the respective driving body; and a gear wheel on the rotary slide and connected with each of the racks for being rotated by the racks due to movement of the driving bodies.

3. The facing head of claim 2, wherein the return device comprises a compression spring for returning the driving bodies to move the slide to the first position.

4. The facing head of claim 3, wherein the compression spring extends parallel to the direction of movement of the respective driving body.

5. The facing head of claim 1, wherein the return device comprises a return spring for returning the driving bodies to move the slide to the first position.

6. The facing head of claim 5, wherein the return device comprises a respective spring element connected to each of the driving bodies for returning the driving bodies radially inwardly toward the center axis.

7. The facing head of claim 6, wherein the respective spring element for each driving body is comprised of a compression spring connected between the base body and the respective driving body.

8. The facing head of claim 7, wherein each compression spring extends parallel to the direction of movement of the respective driving body.

9. The facing head of claim 1, wherein the drive shaft is coupled to the centrifugal drive to be rotated thereby.

10. The facing head of claim 1, wherein the coupling device comprises:

a respective rack at each of the driving bodies and each rack is displaceable along with the respective driving body; and a gear wheel on the rotary slide and connected with each of the racks for being rotated by the racks due to movement of the driving bodies; and the drive shaft being coupled to the gear wheel.

11. The facing head of claim 1, further comprising a throttle device for influencing the movement induced by the centrifugal drive and for allowing a uniform braked rotational motion of the rotary slide in one direction to the second position and virtually non-braked return rotation of the rotary slide to the first position.

* * * * *